(12) United States Patent
Nakada et al.

(10) Patent No.: US 12,308,713 B2
(45) Date of Patent: May 20, 2025

(54) MOTOR ATTACHING STRUCTURE AND MOTOR ATTACHING METHOD

(71) Applicant: NIDEC COPAL ELECTRONICS CORPORATION, Tokyo (JP)

(72) Inventors: Yuki Nakada, Sano (JP); Hiroki Matsushita, Sano (JP); Yasuhiro Tobinai, Sano (JP); Takatoshi Inoguchi, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 195 days.

(21) Appl. No.: 18/161,950

(22) Filed: Jan. 31, 2023

(65) Prior Publication Data

US 2023/0170775 A1    Jun. 1, 2023

Related U.S. Application Data

(63) Continuation of application No. PCT/JP2021/028326, filed on Jul. 30, 2021.

(30) Foreign Application Priority Data

Sep. 18, 2020    (JP) .................................. 2020-157551

(51) Int. Cl.
*H02K 15/14*    (2025.01)
*H02K 5/20*    (2006.01)

(52) U.S. Cl.
CPC ............... *H02K 15/14* (2013.01); *H02K 5/20* (2013.01)

(58) Field of Classification Search
CPC ............ H02K 5/04; H02K 5/16; H02K 5/165; H02K 5/1677; H02K 5/1737; H02K 5/24; H02K 7/086; H02K 7/09; H02K 15/14
See application file for complete search history.

(56) References Cited

U.S. PATENT DOCUMENTS 3,320,660 A * 5/1967 Otto ........................ H02K 15/16
                                                          310/90
3,365,123 A    1/1968 Seabury, III
(Continued)

FOREIGN PATENT DOCUMENTS

JP    2006129638    5/2006
JP    4716750    7/2011
(Continued)

OTHER PUBLICATIONS

Suzuki, Machine Translation of JP2016208597, Dec. 2016 (Year: 2016).*
(Continued)

*Primary Examiner* — Eric Johnson
(74) *Attorney, Agent, or Firm* — Burris Law, PLLC

(57) ABSTRACT

A motor attaching structure and a motor attaching method capable of preventing vibration from occurring are provided. A shaft holding a rotor of a motor rotatable thereon is fixed to a first holder. An annular second holder holds a core serving as a stator of the motor with a peripheral portion thereof being arranged between a case and the first holder. Screws to be used as fixing members fix the case, the first holder, and the second holder integrally to each other. The second holder further includes a holding portion which holds the stator and an absorbing portion located between the peripheral portion and the holding portion and possessing a thickness less than the peripheral portion.

4 Claims, 6 Drawing Sheets

(56) References Cited

U.S. PATENT DOCUMENTS

| | | | |
|---|---|---|---|
| 2012/0121426 A1 | 5/2012 | Kitamura | |
| 2014/0197705 A1* | 7/2014 | Sato | H02K 1/185 |
| | | | 310/91 |
| 2015/0320954 A1 | 11/2015 | Suzuki et al. | |
| 2018/0140145 A1 | 5/2018 | Hayamitsu | |
| 2018/0163747 A1 | 6/2018 | Hayamitsu et al. | |
| 2020/0088182 A1* | 3/2020 | Honda | F04C 29/068 |

FOREIGN PATENT DOCUMENTS

| | | | |
|---|---|---|---|
| JP | 2012102686 | | 5/2012 |
| JP | 2015033522 | | 2/2015 |
| JP | 2016208597 A | * | 12/2016 |
| KR | 20170039987 A | * | 4/2017 |
| WO | 2016189763 | | 12/2016 |

OTHER PUBLICATIONS

Lee, Machine Translation of KR20170039987, Apr. 2017 (Year: 2017).*

International Search Report issued in corresponding International Application PCT/J2021/028326, mailed Sep. 28, 2021.

* cited by examiner

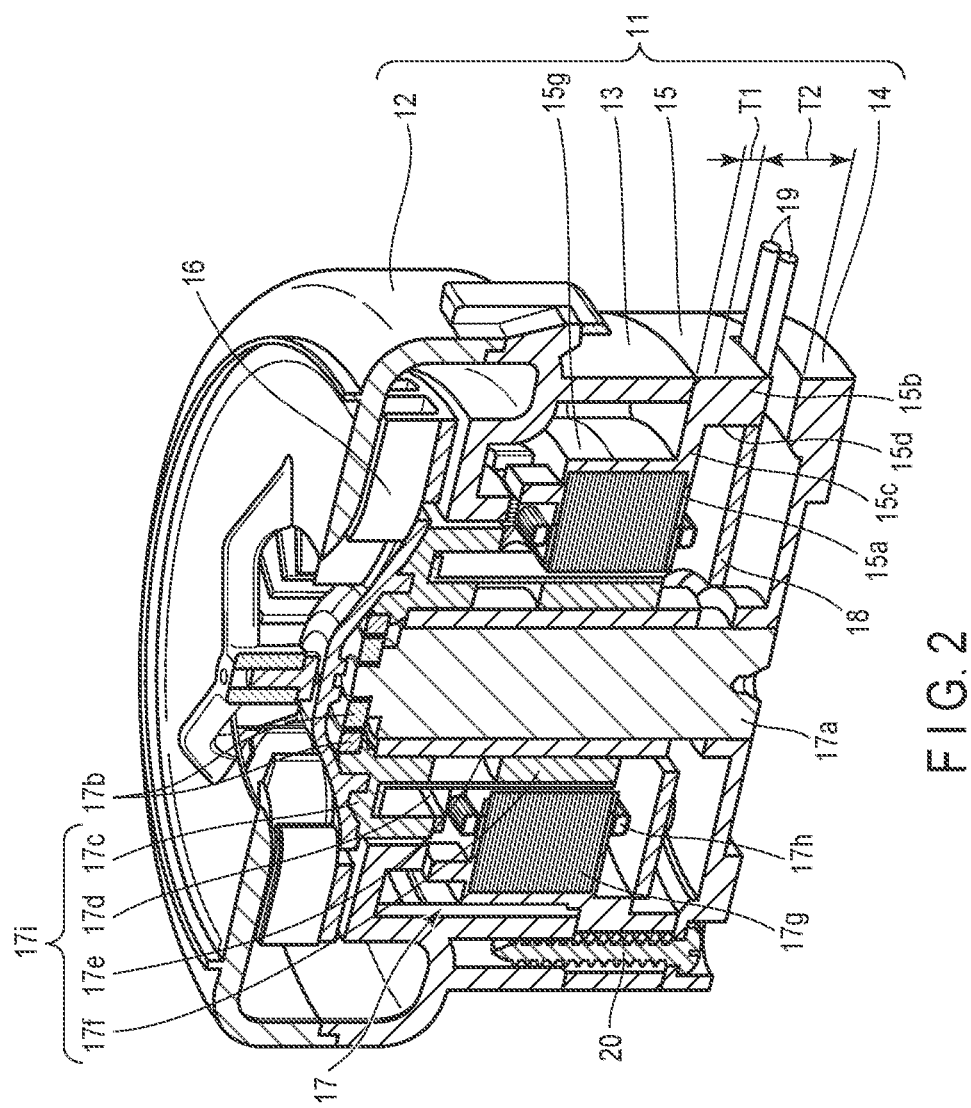
F I G. 2

MOTOR ATTACHING STRUCTURE AND MOTOR ATTACHING METHOD

CROSS-REFERENCE TO RELATED APPLICATIONS

This application is a continuation of International Application No. PCT/JP2021/028326, filed on Jul. 30, 2021, which claims priority to and the benefit of Japanese Patent Application No. 2020-157551, filed on Sep. 18, 2020. The disclosures of the above applications are incorporated herein by reference.

FIELD

Embodiments described herein relate generally to a motor attaching structure and motor attaching method in, for example, an air blower including a centrifugal fan.

BACKGROUND

An air blower using a centrifugal fan includes, for example, a fan, motor configured to rotate the fan, and housing including an air inlet provided in the rotational axis direction, and air outlet arranged in the direction perpendicular to the air inlet. The fan includes a plurality of blades (see, for example, JP 2006-129638 A (Patent Literature 1) and JP 4716750 B (Patent Literature 2)).

SUMMARY

In an air blower including a centrifugal fan, vibration of the motor and sound noise resulting from the vibration deteriorate the quality of the air blower.

The motor includes, for example, a shaft, rotor provided rotatable on the shaft through a bearing and including a magnet, and an annular core arranged around the rotor and including wound coils. When the shaft and rotor of the motor and the annular core thereof are held by members different from each other, if the central axes of the shaft and core become out of alignment with each other, vibration of the core and rotor occurs due to the influence of the electromagnetic force. For example, in a motor including a laminated iron core in which a plurality of wound coils are included, when the central axis of the shaft and central axis of the core become out of alignment with each other, vibration occurs.

One embodiment described herein aims to provide a motor attaching structure and motor attaching method capable of preventing vibration from occurring.

An embodiment of a motor attaching structure comprises a case, a first holder configured to fix a shaft holding a rotor of a motor rotatable thereon, an annular second holder a peripheral portion of which is arranged between the case and the first holder and configured to hold a stator of the motor, and fixing members configured to fix the case, the first holder, and the second holder integrally to each other, wherein the second holder further includes a holding portion configured to hold the stator, and an absorbing portion located between the peripheral portion and the holding portion and possessing a thickness less than the peripheral portion.

An embodiment of a motor attaching method comprises preparing, a case, a first holder to which a shaft holding a rotor of a motor rotatable thereon is fixed, and an annular second holder including a holding portion configured to hold a stator of the motor, and an absorbing portion located between the holding portion and a peripheral portion thereof and possessing a thickness less than the peripheral portion; arranging the second holder between the case and the first holder and arranging the shaft at a central part of the second holder; inserting a first portion of a jig between the shaft and the stator and inserting a second portion of the jig between the shaft and the case; and fixing, at a circumferential part of the first holder, the case, the first holder, and the second holder to each other with fixing members.

Additional objects and advantages of the disclosure will be set forth in the description which follows, and in part will be obvious from the description, or may be learned by practice of the disclosure. The objects and advantages of the disclosure may be realized and obtained by means of the instrumentalities and combinations particularly pointed out hereinafter.

DRAWINGS

The accompanying drawings, which are incorporated in and constitute a part of the specification, illustrate embodiments of the disclosure, and together with the general description given above and the detailed description of the embodiments given below, serve to explain the principles of the disclosure.

FIG. 2 is cross-sectional view along line II-II of FIG. 1.

DETAILED DESCRIPTION

Figure 1:
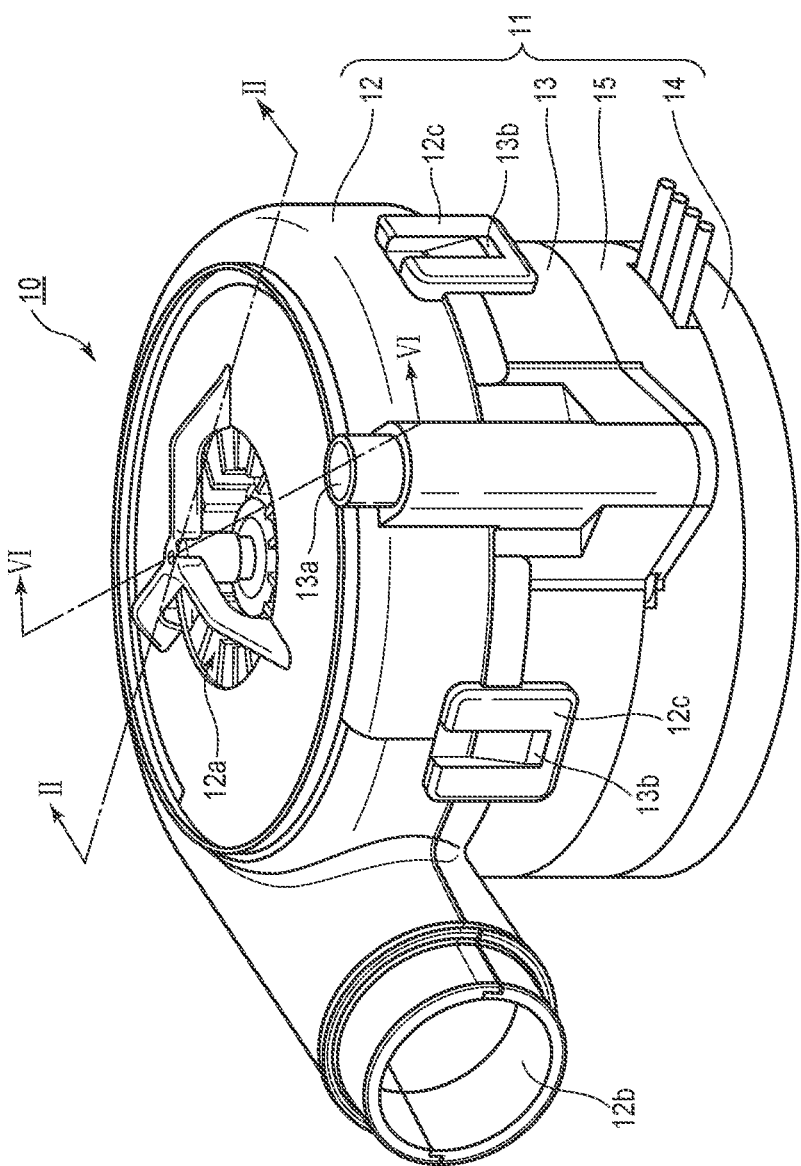
FIG. 1 is a perspective view showing an air blower to which this embodiment is applied.

An embodiment of the present disclosure will be described below with reference to the accompanying drawings. In the drawings, the same parts or parts having the same function are denoted by the same reference symbols.

FIG. 1 shows an air blower 10 in which a centrifugal fan according to this embodiment is used. The air blower 10 includes a first case 12, second case 13, first holder 14, and second holder 15 as housing 11.

The first case 12 and second case 13 are formed of, for example, a resin and separate from each other. Around the first case 12, a plurality of engaging portions 12*c* are provided and, around the second case, a plurality of protrusions 13*b* are provided correspondingly to the engaging portions 12*c*. These engaging portions 12*c* and protrusions 13*b* are engaged with each other, whereby the first case 12 and second case 13 are combined with each other. The first case 12 and second case 13 are not necessarily separate from each other, and may be configured integral with each other.

Each of the first case 12 and second case 13 has approximately a cylindrical shape, and an air inlet 12*a* and air outlet 12*b* are included in these cases 12 and 13. The air inlet 12*a* is arranged in the top surface of the first case 12 and at a central part thereof and, air outlet 12*b* is arranged on the side surfaces of the first case 12 and second case 13 and in the direction approximately perpendicular to the air inlet 12*a*.

On the side surface of the second case 13, a duct 13a having a pipe-like shape and constituting the valve structure to be described later is provided. One end of the duct 13a is made to communicate with the inside of the second case 13 and the other end thereof is positioned at the top surface of the first case 12.

As shown in FIG. 2, in the space constituted of the first case 12 and second case 13, the centrifugal fan (hereinafter referred to as blades) 16 is arranged and, inside the second case 13, first holder 14, and second holder 15, a motor 17 configured to drive the blades 16 is arranged.

The motor 17 is constituted of a shaft 17a, thrust bearing 17b, hub 17c, auxiliary ring 17d, sleeve 17e, annular magnet 17f, core 17g serving as a stator, and a plurality of coils 17h, and the like. The hub 17c, auxiliary ring 17d, sleeve 17e, and magnet 17f constitute a rotor 17i.

One end of the shaft 17a is fixed to the central part of the discoid first holder 14. The first holder 14 is constituted of, for example, a metal and shaft 17a is fixed to the surface of the first holder 14 perpendicularly thereto.

On the other end of the shaft 17a, the rotor 17i is provided with the thrust bearing 17b constituted of, for example, a magnet bearing intervening between them. More specifically, the hub 17c is provided on the thrust bearing 17b and, the blades 16, auxiliary ring 17d, and sleeve 17e are fixed to the hub 17c. The shaft 17a is inserted into the inside of the sleeve 17e. The shaft 17a and sleeve 17e may constitute a known dynamic pressure air bearing. Around the sleeve 17e and between the sleeve 17e and auxiliary ring 17d, the annular magnet 17f is provided.

The annular core 17g is arranged around the rotor 17i. The core 17g is constituted of, for example, a plurality of laminated steel sheets, and coils 17h are wound around a plurality of portions of the core 17g. The core 17g is held by the second holder 15.

The second holder 15 is constituted of, for example, an insulating resin and includes a holding portion 15a, peripheral portion 15b, and absorbing portion 15c located between the peripheral portion 15b and holding portion 15a. The holding portion 15a holds the core 17g. The absorbing portion 15c has a thickness T1, and the thickness T1 is less than the thickness T2 of the peripheral portion 15b (T1<T2). Accordingly, when vibration is generated from the core 17g, the vibration can be absorbed by the absorbing portion 15c.

The thickness of the absorbing portion 15c is less than the thickness of the peripheral portion 15b, and hence a first concave portion 15d is formed on the underside of the second holder 15. Inside the first concave portion 15d, a printed board 18 is arranged. On the printed board 18, components (not shown) constituting a drive circuit of the motor 17 are arranged and, furthermore, to these components, a plurality of lead wires 19 is connected. The plurality of lead wires 19 is drawn to the outside from between the first holder 14 and second holder 15.

Furthermore, the second holder 15 includes a cover 15g configured to cover the core 17g correspondingly to the holding portion 15a for the core 17g, and the coils 17h are wound around a plurality of portions of the holding portion 15a and cover 15g. The cover 15g is also constituted of an insulating resin, and the core 17g and coil 17h are insulated from each other with the holding portion 15a and cover 15g.

The second case 13, first holder 14, and second holder 15 are stacked as described above, and are fixed each other with a plurality of screws 20 as fixing members.

Figure 3:
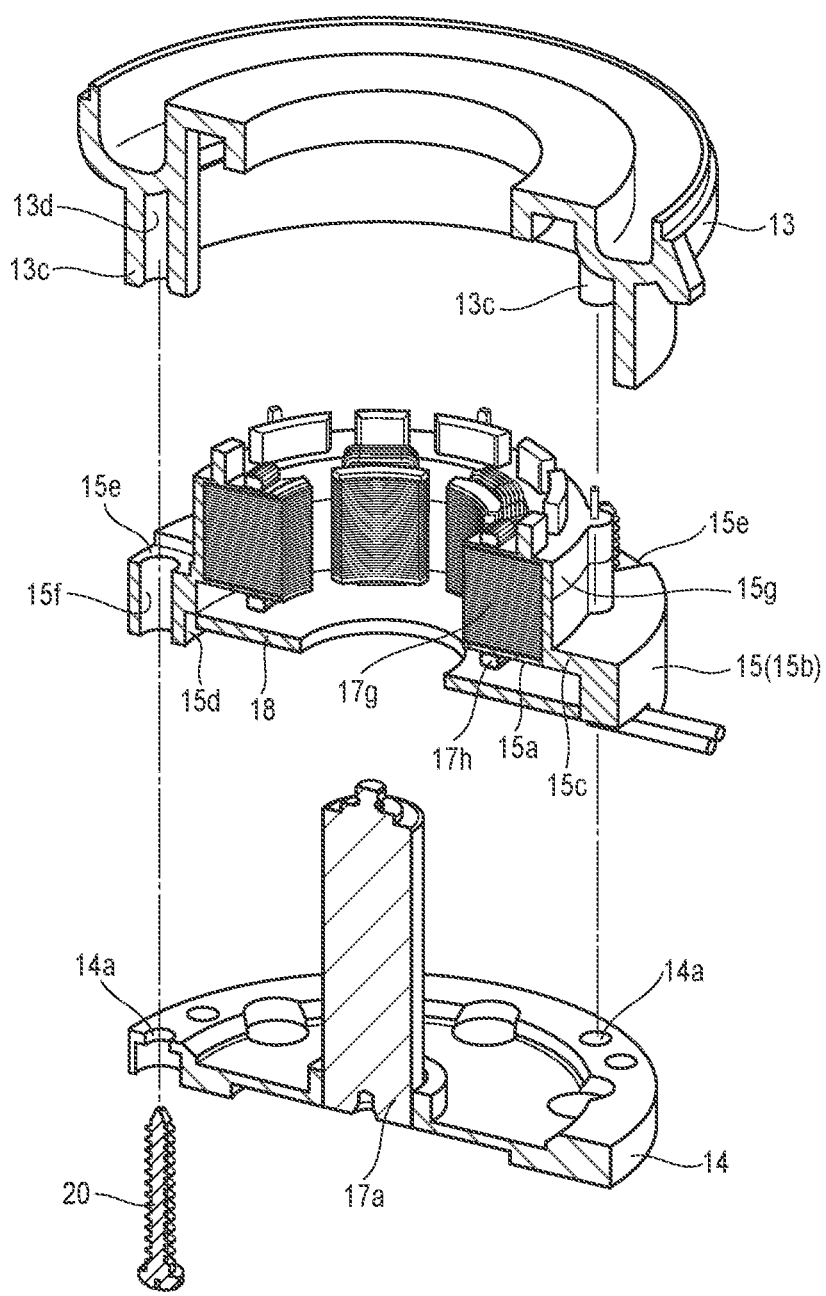
FIG. 3 is a view showing a part of FIG. 2 in an extracting manner and is a perspective view showing a motor attaching structure according to this embodiment in a disassembled form.
Figure 4:
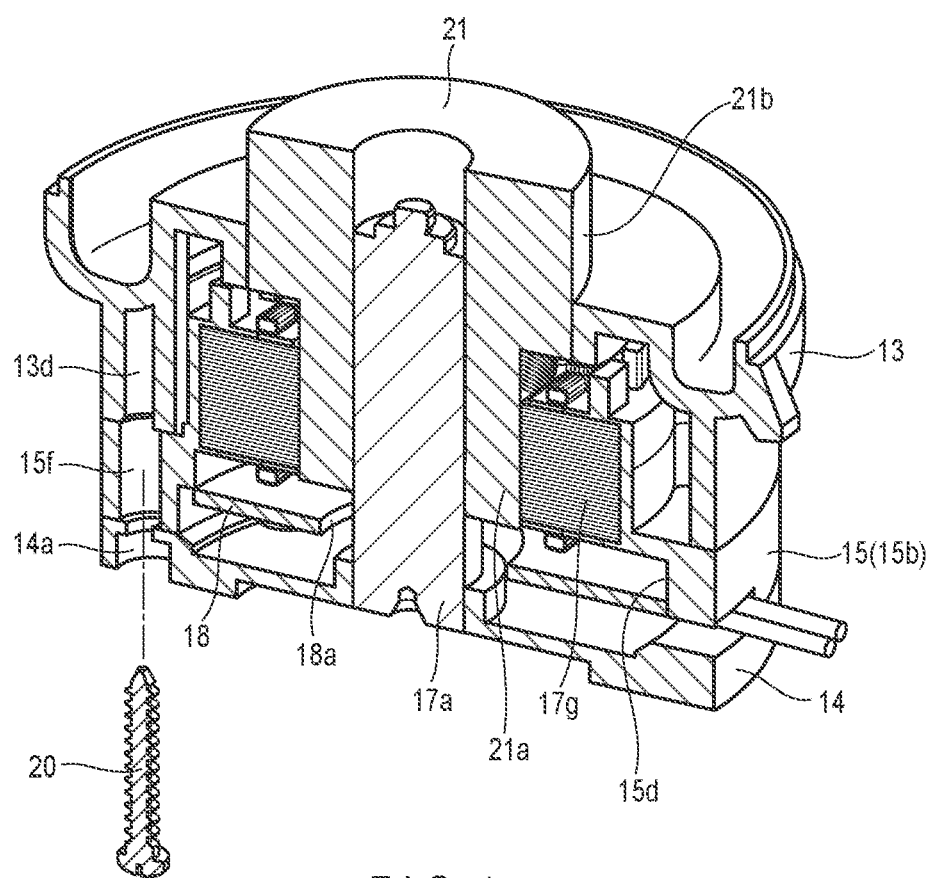
FIG. 4 is a perspective view showing the assembling method of FIG. 3.
Figure 5:
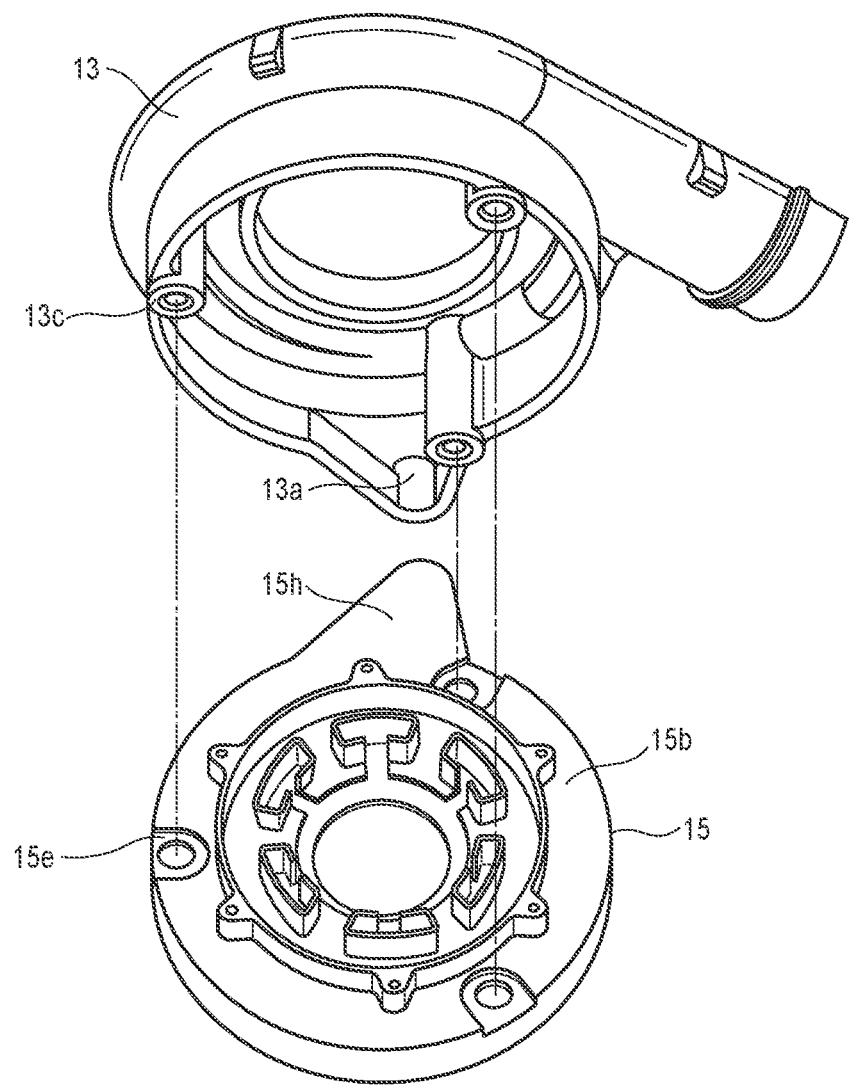
FIG. 5 is an exploded perspective view showing a part of FIG. 1 in an extracting manner.

As shown in FIG. 3, FIG. 4, and FIG. 5, on the upper surface of the peripheral portion 15b of the second holder 15, a plurality of second concave portions 15e are formed, and in a central part of each of the second concave portions 15e, a through-hole 15f is formed.

At the circumferential part on the underside of the second case 13, a plurality of protrusions 13c are formed correspondingly to the second concave portions 15e of the second holder 15, and in a central part of each of the protrusions 13c, a concave portion 13d is formed as, for example, a threaded hole communicating with the through-hole 15f of the second holder 15. The plurality of protrusions 13c has a position adjusting function (aligning function) together with the second concave portions 15e of the second holder 15.

As shown in FIG. 3 and FIG. 4, in some portions at the circumferential part of the first holder 14, a plurality of through-holes 14a is formed correspondingly to the through-holes 15f of the second holder 15.

Figure 6:
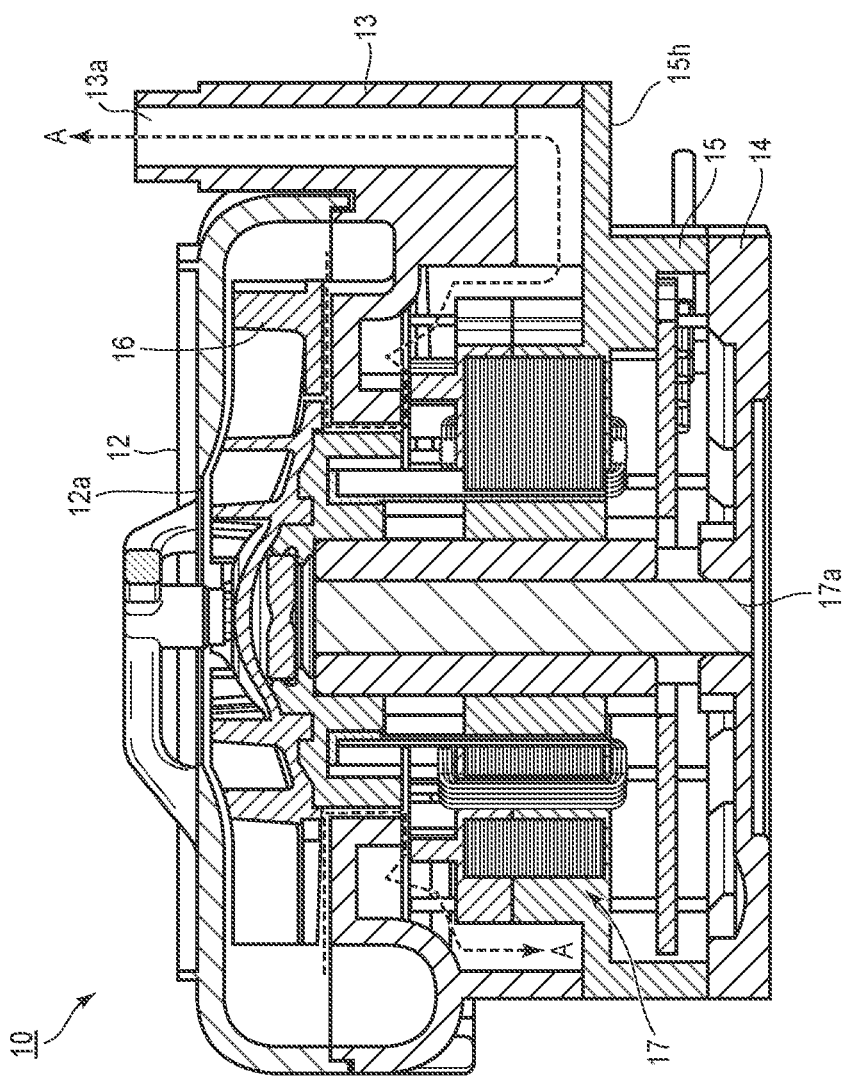
FIG. 6 is a cross-sectional view along line VI-VI of FIG. 1.

As shown in FIG. 5, at a part of the peripheral portion (side surface) 15b of the second holder 15, a lid body 15h is formed in an outwardly extending manner. As shown in FIG. 6, in the state where the second holder 15 and second case 13 are combined with each other, one end of the duct 13a is covered with the lid body 15h. More specifically, the duct 13a is provided on the side surface of the second case 13 along the shaft center line, and a part of one end of the duct 13a is made to communicate with the inside of the second case 13. Accordingly, when the one end of the duct 13a is covered with the lid body 15h, an internal space which makes the duct 13a communicate with the second case 13 and first case 12 is formed.

The blades 16 receive a force in the thrust direction (direction along the shaft center line of the shaft 17a) due to the pressure variation caused by the rotation of the blades 16. In order to suppress the position variation of the blades 16 due to the force in the thrust direction, the duct 13a connecting the lower part of the motor 17 and air inlet 12a to each other is provided on the outer side of the second case 13.

As shown in FIG. 6, in the state where the air blower 10 is assembled, when the blades 16 are rotated, part of the air sucked from the air inlet 12a is exhausted also from the duct 13a through the portion between the undersides of the blades 16 and second case 13, and portion between the motor 17 and second case 13 as indicated by an arrow A shown in FIG. 6. By this flow of the air, it is possible to suppress position variation of the blades 16 in the thrust direction.

Assembling Method of Motor

With reference to FIG. 3 and FIG. 4, an assembling method of the motor having the configuration described above will be described below.

As shown in FIG. 3, first, the second case 13, first holder 14 to which the shaft 17a is fixed, and second holder 15 holding the core 17g are prepared. More specifically, between the holding portion 15a of the second holder 15 and cover 15g, the core 17g is provided, and around portions of the holding portion 15a and cover 15g on the inner circumferential side, the coils 17h are provided. Furthermore, inside the first concave portion 15d of the second holder 15, the printed board 18 is arranged.

Next, in, for example, the second concave portions 15e of the second holder 15, the protrusions 13c of the second case 13 are inserted, and thus the second holder 15 and second case 13 are combined together. In the second concave portions 15e of the second holder 15, the protrusions 13c of the second case 13 are inserted, whereby it is possible to carry out coarse adjustment of alignment.

Thereafter, the first holder 14 to which the shaft 17a is fixed is combined with the underside of the second holder 15. That is, as shown in FIG. 4, the shaft 17a is inserted into the opening 18a provided in the central part of the printed board 18 and is arranged at the central part of the core 17g.

Subsequently, between the shaft 17a and core 17g, for example, an approximately cylindrical jig 21 is inserted. The jig 21 includes a first portion 21a having a thickness equal to an ideal distance between the outer surface of the shaft 17a and inner surface of the core 17g, and second portion 21b having a thickness equal to an ideal distance between the outer surface of the shaft 17a and inner surface of the second case 13. By inserting the jig 21 between the shaft 17a and core 17g, the central axis of the shaft 17a and central axis of the core 17g are made coincident with each other by the first portion 21a, and the central axis of the shaft 17a and central axis of the second case 13 are made coincident with each other by the second portion 21b.

As described above, in the state where centering of the shaft 17a and second case 13 is achieved by using the jig 21, a plurality of screws 20 serving as fixing members are inserted into the through-holes 14a of the first holder 14 and through-holes 15f of the second holder 15 and are screwed into the concave portions 13d of the second case 13. The central axis of the shaft 17a and central axis of the core 17g are made coincident with each other, and hence the central axes of the magnet 17f of the rotor 17i attached to the shaft 17a and core 17g are also made coincident with each other. Accordingly, it is possible to prevent the central axis of the rotor 17i and central axis of the core 17g from becoming out of alignment with each other and prevent vibration from occurring.

Advantageous Effects of Embodiment

According to the embodiment described above, in the second holder 15, between the holding portion 15a configured to hold the core 17g and peripheral portion 15b, the absorbing portion 15c having a thickness less than the peripheral portion 15b is provided. Accordingly, it is possible to prevent the vibration of the core 17g caused by the electromagnetic force of the core 17g from being transmitted to the members other than the second holder 15 and suppress the vibration of the motor 17.

Moreover, in the structure in which the shaft 17a and core 17g are provided on the members different from each other, the central axis of the shaft 17a and central axis of the core 17g are made coincident with each other. For this reason, the central axes of the magnet 17f of the rotor 17i attached to the shaft 17a and core 17g are also made coincident with each other. Accordingly, it is possible to prevent the central axis of the rotor 17i and central axis of the core 17g from becoming out of alignment with each other and prevent vibration from occurring.

Furthermore, centering of the shaft 17a, core 17g, and second case 13 is completed by integrally fixing the first holder 14, second holder 15, and second case 13 to each other with the plurality of screws 20 in the state where the shaft 17a is inserted into the central part of the core 17g, thereafter the first portion 21a of the jig 21 is inserted between the shaft 17a and core 17g, and second portion 21b of the jig 21 is inserted between the shaft 17a and second case 13. Accordingly, it is possible to carry out centering of the plurality of members easily and securely.

Further, the second holder 15 has an approximately circular shape having a diameter equal to the second case 13, and the side surface of the second holder 15 is made flush with the side surface of the second case 13. Accordingly, it is possible to securely cover the part of the second case 13 in the vicinity of the one end portion of the duct 13a provided on the side surface of the second case 13 with the lid body 15h provided on a part of the side surface of the second holder 15.

Moreover, by providing the lid body 15h on the second holder 15, it is possible to make the shape of the first holder 14 a circular shape having a diameter equal to the second holder 15. Accordingly, it is possible to facilitate the processing of the first holder 14.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A motor attaching method comprising:
   preparing, a case, a first holder to which a shaft holding a rotor of a motor rotatable thereon is fixed, and an annular second holder including a holding portion configured to hold a stator of the motor, and an absorbing portion located between the holding portion and a peripheral portion thereof and possessing a thickness less than the peripheral portion;
   arranging the second holder between the case and the first holder and arranging the shaft at a central part of the second holder;
   inserting a first portion of a jig between the shaft and the stator and inserting a second portion of the jig between the shaft and the case; and
   fixing, at a circumferential part of the first holder, the case, the first holder, and the second holder to each other with fixing members.

2. The motor attaching method of claim 1, wherein the case includes a duct possessing a pipe-like shape on a side surface thereof, part of one end of the duct is made to communicate with the inside of the case, the second holder includes a lid body on a side surface thereof, and the one end of the duct is covered with the lid body.

3. The motor attaching method of claim 1, wherein the second holder includes a first concave portion configured to arrange a printed board correspondingly to the absorbing portion.

4. The motor attaching method of claim 3, wherein the second holder includes a plurality of second concave portions on the peripheral portion, and the case includes a plurality of protrusions correspondingly to the plurality of second concave portions of the second holder.

* * * * *